Nov. 13, 1923.
W. B. GILMORE
1,473,847
ANIMAL TRAP
Filed March 5, 1923
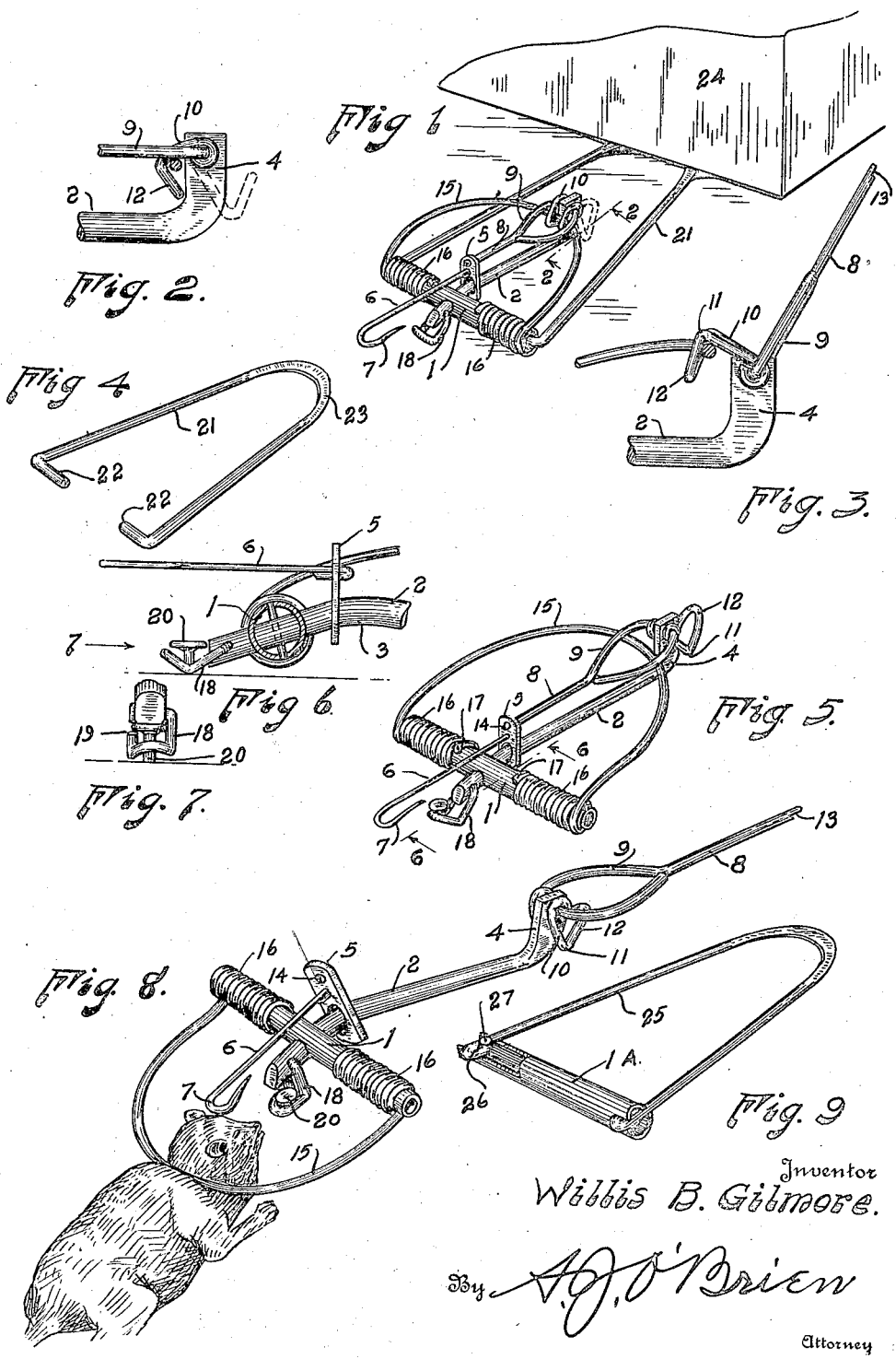
Inventor
Willis B. Gilmore.
By A. J. O'Brien
Attorney Patented Nov. 13, 1923.

1,473,847

UNITED STATES PATENT OFFICE.

WILLIS B. GILMORE, OF IDAHO SPRINGS, COLORADO.

ANIMAL TRAP.

Application filed March 5, 1923. Serial No. 622,756.

*To all whom it may concern:*

Be it known that I, WILLIS B. GILMORE, a citizen of the United States, residing at Idaho Springs, county of Clear Creek, and State of Colorado, have invented certain new and useful Improvements in Animal Traps; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to animal traps of the type described in United States Letters Patent No. 1,384,890 granted to me July 19, 1921.

My present invention relates to an improved construction of the type of trap above referred to, whereby the trap can readily be set on wood or cement floors.

It is an object of this invention to produce a trap that can be handled and set with perfect safety.

It is a further object of this invention to produce an improved trap that can be quickly anchored either to a wood floor or to a stake driven in the ground and which shall also be provided with means, whereby it may be quickly and conveniently set on a cement floor.

With this and other objects, which will readily become apparent, my invention consists of the combination and arrangement of parts hereinafter described, reference for this purpose being had to the accompanying drawing, in which:

Fig. 1 is a perspective view of my trap showing the same set on a cement floor.

Fig. 2 is a detail showing the safety catch in the position it occupies immediately after the trap has been set and before the same has been sprung.

Fig. 3 is a view similar to that shown in Fig. 2, but showing the manner in which the safety catch operates to hold the trap if it is sprung before the safety has been removed.

Fig. 4 is a perspective view of the member used to hold the trap when it is set on a cement or other hard floor.

Fig. 5 shows the trap in operative position and fully set.

Fig. 6 is a detail showing how the trap may be anchored to a nail.

Fig. 7 is an end view of the parts shown in Fig. 6 and looking in the direction of the arrow 7.

Fig. 8 is a perspective view showing the trap in sprung position; and

Fig. 9 shows a slightly modified form of construction.

The same reference characters will be employed to designate the same parts throughout the several views.

My trap is formed in part by a framework comprising a tubular member 1 which has a diametrical hole centrally thereof. A rod 2 has one end projecting through the hole in the tubular member 1 so as to form a structure closely resembling a cross. The bar 2 is bent slightly at the point 3 directly back of the tubular member and has its rear end 4 flattened and curved upwardly. Owing to the bend at point 3, the two ends only of the bar 3 will rest on the floor and thus leave a space in which the trigger-plate 5 can be freely moved. A bait-hook 6 is rigidly secured to the trigger-plate and has its end 7 reversely bent as shown. A trigger 8 is pivotally connected to the upper end of the part 4 so as to be freely movable with respect thereto. The trigger 8 has the rear end thereof formed into a rather large closed loop 9. Hinged to the loop 9 is a hook 10 which I shall refer to as a safety catch. This hook is formed of a piece of wire bent into U-shape, the ends being looped so as to engage the loop 9. The U-shaped part is then bent at 11 so as to form a hook portion 12. The front end of the trigger 8 has a notched portion 13 which is received in the opening 14 of the trigger plate when the trap is set. A bail 15 is provided whose end portions are wrapped around the ends of the tubular member 1 to form springs whose tendency is to rotate the bail in a counterclockwise direction. The ends 17 of the spring portions 16 are hooked and project into suitable openings in the tubular member 1 and serve as the means for preventing the spring parts from rotating. Pivoted to the front end of the bar 2 is a wire loop 18 bent intermediate its ends into substantially an L-shape. One side of the loop is open, as indicated at 19 (Fig. 7). The function of loop 18 is to serve as a means by which the trap can be anchored to an ordinary wire nail 20 which may be driven into the floor such a distance that the head will be about one-half ($\frac{1}{2}$) inch above the surface thereof. The trap is secured to the nail by inserting the head of the nail in the opening 19 in the manner shown in Fig. 7 and then pull the trap rearwardly until it reaches a position like that shown in Fig. 6. The trap can be removed from the nail by again getting the parts into the position shown in Fig. 7 and moving the trap forwardly, and this position cannot be assumed by the trap after it has been sprung, so that there is scarcely any possibility of the trap becoming loose, even if the animal were not immediately killed, as it nearly always is.

The trap is set as follows: The bail 15 is forced in a clockwise direction into the position shown in Fig. 5 and the trigger 8 is moved into position to hold it. The safety catch 10 is then rotated into place so that the hook portion 12 will engage over the bail. The operator can now feel sure that the bail cannot fly loose and cause him injury. The trigger plate 5 is now moved rearwardly and the end 13 of the trigger 8 is inserted into the hole 14. The trap is now secured in place to the head of the nail, the bait secured to the hook 7 or scattered on the floor beneath the same, after which the safety is removed. If the trap is to be carried or transported the parts are arranged as shown in Fig. 5 and the trigger-plate is shoved rearwardly until it abuts the loop portion 9 and the safety catch put into operative position. When so adjusted, the trap can be handled in any way desired without danger of springing it. Attention is called at this point to the fact that the hole in the trigger-plate through which the bar 2 extends is oval and not round. The rod 2 therefore engages the sides of the hole and not the bottom, thus making a very freely moving pivot. It often happens that there is some objection to driving an anchoring nail into the floor, and at other times it is necessary to set the trap on a cement floor where nails cannot be employed. In order to enable the trap to be set on any type of floor, I provide an anchoring member 21, shown in perspective in Fig. 4. This member is formed somewhat in the shape of a long narrow U wider at the top than at the bottom and having the ends of the sides bent inwardly, as indicated by numeral 22. The bottom 23 of the U is flattened so as to increase its rigidity. Member 21 is secured to the trap by inserting the ends 22 into the open ends of the tubular member 1 in the manner shown in Fig. 1. The trap is held in place by a weight 24 which may be a box or barrel, or any similar object of sufficient weight to perform the desired function. When the trap is secured to a nail, as in Fig. 8, it is evident that the tension of the bail, after the trap has operated, will be resisted by the nail, whereas, if the trap is set, as shown in Fig. 1, the bail will tend to raise the tubular member 1 upwardly against the resistance of the spring 21 which must be made of material of sufficient strength to resist this force.

In Fig. 9 I have shown an anchoring member 25 which is similar to member 21 and performs a similar function, but, instead of having its ends bent in the manner shown in Fig. 4, they are doubled back for a short distance in the manner indicated by numeral 26 and the extreme end 27 is turned upwardly. The tubular member 1ᴬ, which is substituted for member 1 in the other views, has its ends slotted to receive the doubled ends of the anchoring member 25, the end 27 serving as a stop for preventing longitudinal movement.

From the above, it will be apparent that I have invented a trap which is of very simple construction, which can be made entirely of metal and which can be conveniently anchored to a floor. My trap is provided with a safety catch, which, when in operative position, positively prevents the trap from being accidentally sprung while it is being set. As explained above, the trigger-plate is adapted to be moved longitudinally both on the bar 2 and on the trigger 8, and when arranged for transportation or handling, can be moved rearwardly until it contacts with the front part of loop 9, thus getting the bait hook 7 out of the way and securely locking the bail.

Having now described my invention and shown what I at present consider the preferred embodiment thereof, what I claim as new is:

1. A trap comprising a rigid member; a spring bail operatively connected to said member; a bar secured to said member substantially at the middle point thereof; a trigger pivotally secured to said bar; a trigger-plate slidably mounted on said bar and provided with an opening for the reception of the free end of the trigger; a bait hook secured to said trigger-plate; and a safety catch operatively connected to the rear end of said bar, said catch being adapted to engage said bail.

2. A trap comprising a rigid tubular member; a spring bail operatively connected to the same; a bar secured at right angles to said member at a point substantially midway between its ends, the front end of said bar being bent downwardly and the rear end thereof being bent upwardly; means secured to the front end of said bar for anchoring the trap to a nail; a trigger pivotally connected to the rear end of said bar; a trigger-plate slidably connected to said bar and provided with an opening adapted to receive the trigger; a bait hook connected to the trigger-plate, and a safety hook pivotally connected to said bar and adapted to engage said bail.

3. A trap comprising a rigid tubular member; a spring bail operatively connected thereto; a bar secured transversely to said member at a point intermediate its ends, the front end of said bar being downwardly directed and the rear end thereof being upwardly bent; a trigger pivotally connected to the rear end of said bar and adapted to retain the spring bail in set position; a trigger-plate slidably secured to said bar and having an opening adapted to receive the end of the trigger and hold the same against the action of the spring bail; a bait hook secured to the said trigger-plate; and a safety-catch means comprising a hook pivotally connected to said bar and adapted to engage the bail.

4. A trap comprising a rigid tubular member; a spring bail operatively connected thereto; a bar secured transversely to said member at a point intermediate its ends, the front end of said bar being downwardly directed and the rear end thereof being upwardly bent; a trigger pivotally connected to the rear end of said bar and adapted to retain the spring bail in set position; a trigger-plate slidably secured to said bar and having an opening adapted to receive the end of the trigger and hold the same against the action of the spring bail; a bait hook secured to the said trigger-plate; a safety catch; means comprising a hook pivotally connected to said bar and adapted to engage the bail; and an anchoring means secured to the ends of said tubular member.

5. A trap comprising a rigid member; a spring bail connected therewith; an arm secured to said member; a trigger secured to said arm and adapted to hold the bail in set position; means movably connected with said bar and adapted to engage the trigger to hold the same against the action of the bail; a bait hook connected to the last named means; and a safety catch secured to the bar and adapted to engage and hold the bail when the trigger releases the same.

6. A trap comprising a rigid member; a spring bail connected therewith; an arm secured to said member; a trigger secured to said arm and adapted to hold the bail in set position; means movably connected with said bar and adapted to engage the trigger to hold the same against the action of the bail; a bait hook connected to the last named means; a safety catch secured to the bar and adapted to engage and hold the bail when the trigger releases the same; and means comprising a U-shaped resilient member connected to the ends of said tubular member for anchoring the trap.

7. A trap comprising a rigid member; a spring bail connected therewith; an arm secured to said member; a trigger secured to said arm and adapted to hold the bail in set position; means movably connected with said arm and adapted to engage the trigger to hold the same against the action of the bail; a bait hook connected to the last named means; a safety catch secured to the arm and adapted to engage and hold the bail when the trigger releases the same; and means for anchoring the trap to a floor, said means comprising a U-shaped resilient member having its ends secured to the ends of the tubular member and adapted to receive a weight for holding the trap in place on the floor.

In testimony whereof I affix my signature.

WILLIS B. GILMORE.